US012214353B2

(12) United States Patent
Scharfe

(10) Patent No.: US 12,214,353 B2
(45) Date of Patent: Feb. 4, 2025

(54) COMMINUTION DEVICE

(71) Applicant: PMS Handelskontor GmbH, Hamburg (DE)

(72) Inventor: Felix Scharfe, Hamburg (DE)

(73) Assignee: PMS HANDELSKONTOR GMBH, Hamburg (DE)

( * ) Notice: Subject to any disclaimer, the term of this patent is extended or adjusted under 35 U.S.C. 154(b) by 156 days.

(21) Appl. No.: 17/754,527

(22) PCT Filed: May 14, 2020

(86) PCT No.: PCT/EP2020/063441
§ 371 (c)(1),
(2) Date: Apr. 5, 2022

(87) PCT Pub. No.: WO2021/104683
PCT Pub. Date: Jun. 3, 2021

(65) Prior Publication Data
US 2024/0058823 A1 Feb. 22, 2024

(30) Foreign Application Priority Data

Nov. 29, 2019 (EP) .................................... 19212628

(51) Int. Cl.
*B02C 13/288* (2006.01)
*B02C 13/14* (2006.01)
(Continued)

(52) U.S. Cl.
CPC ............ *B02C 13/288* (2013.01); *B02C 13/14* (2013.01); *B02C 13/16* (2013.01); *B02C 13/18* (2013.01);
(Continued)

(58) Field of Classification Search
CPC .................. B02C 13/14; B02C 13/288; B02C 2013/28681; B02C 13/282; B02C 13/286;
(Continued)

(56) References Cited

U.S. PATENT DOCUMENTS 4,245,999 A 1/1981 Reiniger
2008/0251618 A1* 10/2008 Gronholz ................ B02C 13/14
241/161

(Continued)

FOREIGN PATENT DOCUMENTS

CN 107913768 A 4/2018
CN 110505921 A 11/2019
(Continued)

OTHER PUBLICATIONS

Japanese Office Action with translation mailed Jul. 4, 2023.
(Continued)

*Primary Examiner* — Jared O Brown
(74) *Attorney, Agent, or Firm* — WELSH FLAXMAN & GITLER LLC

(57) ABSTRACT

A comminution device for mechanically comminuting material conglomerates consisting of materials of varying density and/or consistency, including a comminution chamber having a supply side with a supply device above the comminution chamber and a discharge side, which comminution chamber is enclosed by a circular cylindrical and/or conical, downwardly widened comminution chamber wall and has at least two portions in succession in the axial direction, in each of which at least one rotor is arranged coaxial with the comminution chamber, each rotor having a rotor shaft and having striking tools which extend substantially radially into the comminution chamber at least during operation, the rotors having opposite directions of rotation in at least two successive portions, deflection ribs being arranged on the
(Continued)

inside of the comminution chamber wall at axial intervals and/or the radius of the comminution chamber wall increases from top to bottom.

17 Claims, 4 Drawing Sheets

(51) Int. Cl.
| | | |
|---|---|---|
| *B02C 13/16* | (2006.01) | |
| *B02C 13/18* | (2006.01) | |
| *B02C 13/20* | (2006.01) | |
| *B02C 13/284* | (2006.01) | |
| *B02C 13/286* | (2006.01) | |
| *B02C 13/28* | (2006.01) | |

(52) U.S. Cl.
CPC ............ *B02C 13/20* (2013.01); *B02C 13/205* (2013.01); *B02C 13/284* (2013.01); *B02C 2013/2816* (2013.01); *B02C 2013/28672* (2013.01); *B02C 2013/28681* (2013.01)

(58) Field of Classification Search
CPC ........... B02C 2013/28609; B02C 2013/28618; B02C 2013/28672
See application file for complete search history.

(56) References Cited

U.S. PATENT DOCUMENTS

| | | | |
|---|---|---|---|
| 2015/0034747 A1* | 2/2015 | Watts | ..................... B02C 13/14 |
| | | | 241/55 |
| 2016/0228879 A1* | 8/2016 | Scharfe | ................... B02C 13/14 |

FOREIGN PATENT DOCUMENTS

| | | |
|---|---|---|
| EP | 2851122 A1 | 3/2015 |
| JP | S50156061 A | 12/1975 |
| JP | 2016530097 A | 9/2016 |
| WO | 2004024331 A1 | 3/2004 |
| WO | 2013167398 A1 | 11/2013 |

OTHER PUBLICATIONS

Canadian Patent Office Report May 24, 2023.
Brazil Patent Office Office Action with translation mailed Apr. 15, 2024.

* cited by examiner

COMMINUTION DEVICE

BACKGROUND OF THE INVENTION

The present invention concerns a comminuting or stripping device, in particular for metals and mineral substance compounds in ores (in the field of mining), industrial slag containing metal, thermal waste recovery slag containing metal, and any other material conglomerates. It is known that various metals and mineral substance compounds are to be found in ores, which, according to the present state of the art, can only be separated from the corresponding ores with a great deal of effort.

The efficient extraction of the metals is considerably simplified by totally stripping or separating all the materials occurring in the ores. During the process of smelting the metals, it cannot be avoided that molten metals (e.g. Fe and Cu) get into the slag, due to the melting process, and these are likewise difficult to recover.

Numerous ferrous and non-ferrous metals are to be found in the slags and ashes of thermal waste recovery, as well as the slags of metal production, which are integrated into mineral slags in pure form or heavily scaled. It is only possible to efficiently recover such metals from material conglomerates if these metals are released or separated from their compounds/scaling in such a way that they can subsequently be isolated from the material flow by magnets or non-ferrous metal separators.

According to the art, slag is shredded with conventional hammer and impact mills and is subsequently fed to magnets and non-ferrous metal separators.

Using hammer and impact mills, it is possible, and also efficient, to release and recover metals having a particle size of over 20 mm. In regard to the release of smaller metal particles with such mills, very small gap clearances need to be set, for example under 20 mm, which would lead to a great increase in the mill crushing at the expense of the impact crushing. Said mill crushing would have the consequence that soft non-ferrous metals would be ground in such a way that they could no longer be separated using a non-ferrous metal separator. Thus, it is only possible to recover small metal particles existing in the slag in a pure form with the comminution devices forming the art to a limited extent.

European Patent No. EP 2 529 835 A2 shows a comminution device.

SUMMARY OF THE INVENTION

The task of the invention is therefore to create a comminution device with which it is possible to mechanically release and/or shred and/or separate off pure metal particles and mineral substance compounds integrated into the slag and ores. It should, moreover, be possible to use the invention on material conglomerates made of materials of different densities and/or consistencies.

The problem is solved by a comminution device for mechanically comminuting material conglomerates consisting of materials of varying density and/or consistency, comprising a comminution chamber (14) having a supply side with a supply device (12) above the comminution chamber (14) and a discharge side, which comminution chamber is enclosed by an, in particular, circular cylindrical and/or conical, downwardly widened comminution chamber wall (42) and has at least two portions in succession in the axial direction, in each of which at least one rotor (26, 28, 30) is arranged coaxial with the comminution chamber, each rotor having a rotor shaft (25, 27, 29) and having striking tools (38) which extend substantially radially into the comminution chamber (14) at least during operation.

The comminuting and/or separating device in accordance with the invention has an inherently known comminution chamber with a supply end and an outlet end. The comminution chamber is preferably surrounded by a preferably cylindrical, in particular arched, comminution chamber wall, which is usually aligned vertically, wherein the supply end is to be found at the top and the outlet end at the bottom or at the side. Essentially, it is, however, also possible to arrange the axis horizontally, if the equipment is used to prepare only very small material conglomerates, using a horizontal airstream. Otherwise, the material is fed in, in a vertical arrangement, from top to bottom, gravimetrically, and through a fan rotor which comes with its own drive mechanism. The comminution device in accordance with the invention can be used to separate material conglomerates, but also only for comminuting conglomerates.

The comminution chamber has at least two, preferably three, successive sections in the direction of the cylindrical axis. At least one rotor arranged centrally or concentrically to the comminution chamber, on which striking tools which at least extend radially into the comminution chamber when the comminution device is being operated are arranged, is to be found in each of these sections. Should chains or movable striking tools be used as striking tools, these only extend radially into the comminution chamber if the rotor turns with a corresponding rotational speed. The striking tools serve the purpose of breaking up the material conglomerates in the manner described in further detail—possibly in conjunction with inherently well-known impact bars on the comminution chamber wall yet to be described.

A supply device, e.g. a feed cone, which preferably covers up the rotor shaft, is placed at the supply end via the comminution; chamber so that preferably an even feed of material is achieved solely in the range of action of the striking tools, which is important for a good separation result.

The rotational direction of the rotors in at least two, preferably all, successive sections is counter-rotational, which leads to high disintegration speeds between the particles to be separated and the striking tools, for it is, in this way, achieved that the particles which are accelerated by the striking tools of a rotor clash frontally with the striking tools turning in the opposite direction in the case of the rotor following in the direction of the material flow. The impact energy is thus the sum of the particle speed and the speed of the striking tools. This results in an extremely high degree of impact energy of the material particles on the subsequent striking tools or on the impact bars on the comminution chamber wall, which leads to the material conglomerates breaking up, as long as materials of different densities and/or consistency, e.g. elasticity, are to be found in them. Finally, the rotational speed of the rotors can, according to the invention, vary between the sections of the supply end and the outlet end of the comminution chamber. In this way, it is achieved that the impact energy of the material conglomerates in the area of increasing particle density may increase in the direction of the outlet end, as the rotational speeds of the rotors, and thus the absolute speed of the striking tools, are also increased there.

Deflection ribs with a preferably annular or vertical orientation (impact bars) are located on the inside of the comminution chamber wall preferably at axial/circumferential intervals, and/or the radius of the comminution chamber walls increases from the top to the bottom, which leads to the stream of particles not being streamed along the outer wall of the comminution chamber, without getting into the range of action of the striking tools. Such a bypass stream is thus efficiently prevented. These deflection ribs are preferably located in the area of at least two rotors or between the rotors on the comminution chamber wall, whereby the flow of material which falls down on the inside of the comminution chamber is effectively diverted into the range of action of the striking tools. The deflection rib preferably has an upper edge that extends from the outer top area to the inside bottom area, which improves the guiding function of the latter.

At least one dust outlet is arranged in and/or below the comminution chamber wall, and/or in connection with a material outlet, which dust outlet is connected to an air flow device. The air flow device is provided for discharging the particle/air mixture from the comminution chamber via the at least one outlet, which extends through the chamber wall. This makes it possible to guide and discharge the particles/air mixture generated in the comminution chamber out of the comminution chamber. The air flow device has at least one fan rotor for sucking the particle/air mixture from the comminution chamber, whereby preferably the speed of the fan can also be controlled, for optimum separation of the material conglomerate. The material in the comminution chamber is usually broken up by the striking tools in such a way that a high number of dust particles occur. If the valuable components are contained in these dust particles, the fan can be switched to a high number of revolutions, whereby the "valuable" dust can be conveyed into a settlement tank or flotation, in order to be collected for further preparation. Should the dust rather be the undesired part, the fan can be switched to a low number of revolutions. The valuable components of the material conglomerates can largely be fully exhausted in this way, in regard to which the fine dust escapes or can be supplied to a dust collector. Furthermore, such a clear separation of the components of the material conglomerates can be achieved as was up to now only possible with very much more complex procedures, e.g. chemical processes. The dust outlet may e.g. be arranged directly in the chamber wall and/or below the chamber wall, and/or in a material outlet of the comminution device so that the dust generated in the comminution chamber is effectively drawn out.

The sucking of dust from the comminution cylinder via the air flow device saves energy as too much dust in the comminution chamber affects the operation of striking tools. The invention thus offers an improved efficiency of the comminution device. Furthermore, valuable materials may be present in the "dust fraction" so that the defined discharge of the dust from the comminution chamber and the option of further processing of the discharged dust offers a better possibility to refine all valuable materials from the feed material, regularly ores. The valuable materials may already be unveiled in the high impact crusher of the present invention after the first stage, i.e. below the uppermost rotor. Accordingly, the sucking of the dust already after/below the first rotor may be advantageous for the exploitation of valuable materials, for example to be handled directly into a flotation plant or into a slurry for transport to further treatment. Thus the comminution device of the present invention saves a lot of energy as it allows an extensive exploitation of valuable metals from ores by for example bypassing further crushing stages or ball mills.

Generally, the crushing of ores in the mining industry makes up for more than 50% of the total energy costs of a plant and affects more than 2% of the global energy consumption. Therefore this invention can contribute to reducing the energy footprint of a plant.

The material particles are, furthermore, compulsorily discharged from the comminution chamber through the air flow device after being shredded sufficiently, and thus do not prevent larger particles from being successfully shredded. On the other hand, it is ensured that the small material particles, which sometimes even create dust, are also safely conveyed from the comminution chamber into a preparation area, where they can then be separated off or isolated from the airstream through separators, in particular centrifugal separators, especially cyclones. Following the isolation, a procedural step can be carried out, e.g. a density separation, to separate the content of the ore from the slag, in order to obtain the desired ore content.

Preferably the dust outlet is connected to the air flow device having a fan rotor via a channel so that the fan rotor can be located separately from the comminution chamber. Further, the channel can be arranged to block the entrance of not sufficiently broken up larger material conglomerates. Thus, the fan rotor is also protected against being hit by larger particles.

Accordingly, preferably at least a portion of the channel extends in an upwards direction. This leads to the return of entering larger particles back into the comminution chamber based on gravity, whereas the dust continues to follow the upwards directed portion to the fan rotor and to an optional dust processing and discharging equipment.

In a preferred embodiment of the invention, the dust outlet is covered with a grid. Also, this solution prevents larger material conglomerates yet to be crushed from leaving the comminution chamber and entering the dust outlet.

In order to ensure that the dust is collected at a place where the material conglomerates are already sufficiently broken up, the dust outlet is arranged below the upper portion and/or below the lower portion of the comminution chamber.

Optionally an inlet hopper is arranged above the feed cone, in regard to which an inlet area is formed between the inlet hopper and the feed cone, the size of which (e.g. the width "d") is preferably adjustable or can be controlled. This can, for example, be implemented by means of axial adjustability of the inlet hopper and/or feed cone. In this way, the supply of the material in interaction with that of the control of a fan rotor placed in the outlet area can be controlled in such a way that a desired time for retaining the fine particles in the comminution device is set, whereby the particle size distribution of the shredded material, and thus also the separation properties of the comminution device, can be set to various different material conglomerates, very individually. The inlet hopper can also be formed by way of a configuration achieving substantially the same result, which makes it possible for the feedstock to be supplied to the feed cone. Preferably, via the additional adjustability of the fan rotor, the duration of the particles in the comminution chamber and thus the resulting particle size distribution can be fine-tuned quite accurately.

An inlet area in the form of a gap having the width "d" is formed between the inlet hopper and the feed cone. In this way, feedstock is fed evenly into the entire area of rotation of the comminution chamber. The areas of the inlet area, i.e. the distance "d" between the inlet hopper and the feed cone, are adjustable. The bulk current supplied in this way can easily be controlled via the width "d" of the inlet area. In addition, through this control of the width "d" of the inlet area between the inlet hopper and the feed cone, the maximum diameter of conglomerates supplied can be limited, which in turn contributes to increasing the efficiency of the entire piece of equipment. In addition, the airstream in the comminution device can also be controlled by controlling the width of the inlet area. In connection with the control of the fan rotor through electronic control, a particle stream optimally adjusted to suit the purpose can therefore be set. The setting of the inlet area ideally interacts with the individual control of the fan rotor. In this way, the retention times of particles in the comminution chamber, and thus the degree of comminuting, can be set, and even regulated finely.

In order to easily set the size of the inlet area, the inlet hopper is preferably held in an axial direction in such a way that it can be slid. This solution is technically simple to implement and is very effective.

The inlet area formed between the inlet hopper and the feed cone is at least largely identically constructed around the central axis of the comminution chamber, in order to guarantee an even feed, and thus an even comminuting effect in the entire area of rotation of the comminution chamber.

In an advantageous enhancement of the invention, the comminution device has a control for driving the fan, and a dust sensor is located at the supply end, wherein the fan drive can be controlled, depending on the output signal of the dust sensor. It can thus be achieved that—in so far as it contains valuable components—the dust is supplied to a fine particle recovery plant, e.g. a hutch chamber or flotation chamber. Otherwise, it can be supplied to a dust collector, to implement an environmentally-friendly solution.

It is advantageous in this case if the control and the fan drive permit the fan rotor to be operated at different rotational speeds, and the rotational speed can be regulated, depending upon the output signal of the dust sensor. The stream of particles in the comminution chamber can then be adjusted very accurately to the particle fractions probably to be expected.

In an advantageous enhancement of the invention, the striking tools are placed at various levels on a rotor, offset in relation to one another. This leads to effective and even comminuting of the feedstock.

In an advantageous enhancement of the invention, the rotors have a rotor casing in the sections that go consecutively from the supply end to the outlet end, the radius of which remains constant over the axial length of the comminution chamber. In this way, the rotors are protected against the stream of particles moving at high speed, and the stream of particles is limited in a defined manner in the area of the rotors. In this way, the rotor casing is preferably likewise covered over by the feed cone, so that the flow of material in this area is reduced.

The rotors preferably have a rotor casing in the form of a cylinder with a constant radius. That means: the radius or the base area of the cylinder is the same in all sections. Such a rotor casing, firstly, prevents material from getting caught in the rotor. Secondly, a cylinder is easy to manufacture. The cylinder can have a polygonal or round, e.g. circular, base area. For reasons of easy cleaning and preventing material from sticking and minimization of wear and tear, a circular base area of the cylinder is appropriate. In the case of an advantageous polygonal base area of the cylinder, a certain amount of leverage can be achieved for the particles, i.e. that particles which fall down on the rotor casing are once again conveyed outwards through the edges of the polygon, into the range of action of the striking tools. The polygonal, e.g. quadratic or star-shaped base area is therefore appropriate if it is desired to achieve a high degree of comminuting efficiency in an improved interaction with the striking tools.

The rotor casing preferably includes several exchangeable rotor casing components, held on the rotor. When transferring the particles of material into the radial outer region of the comminution chamber, the rotor casing is exposed to a certain degree of wear and tear, so that only the rotor casing elements need to be exchanged, which is considerably cheaper than if the entire rotor had to be replaced. In addition, the rotor, casing protects the components of the rotor located further to the inside, e.g. the bearings.

Retaining bars, running axially or on a slant, which divert the flow of material from the rotor casing in the direction of the range of action of the striking tools, are preferably placed on the rotor casing. The retaining bars, which extend into the comminution chamber axially and radially, are preferably formed at least on the second rotor, or the penultimate rotor, in the direction of the material flow. These retaining bars carry material particles with them and accelerate them radially outwards, so that this material can then re-enter the range of action of the striking tools, and can be effectively broken down there.

While it is, essentially, possible to use a drive mechanism for the rotors and provide for the direction of rotation in the opposite direction and different rotational speeds via corresponding gears, it is to be preferred that every rotor has its own drive mechanism, which can be operated or controlled independently of the other rotors. In this way, the rotational speeds can be individually adjusted to different material conglomerates to be released, which, with a single drive for all rotors, could only be implemented in a more complex way.

The striking tools are preferably detachable or can be exchanged through a fastening device formed on the rotor, as a result of which they can be exchanged easily.

The fastening device preferably includes plates that are concentric to one another, which are firmly arranged at an axial distance to one another on the rotor, which plates have holes that are concentric to one another, which can be penetrated by bolts, which in turn pass through recesses in the mounting portion of the striking tools. The mounting portion of the striking tools may, therefore, for example, contain a recess or a hole, which is penetrated by the bolt between two plates. The mounting portion of the striking tool may, therefore, for example, be formed by at least one chain link or a perforation. This makes it possible to fasten the striking tools on the rotor in such a way that they can easily be detached.

The fastening device preferably has at least two receptacles for the striking tools, axially offset in relation to one another. In this way, striking tools can be axially offset in relation to one another but fastened to the rotor so that they overlap in the circumferential direction, which produces a high degree of comminuting efficiency.

The striking tools are preferably formed, in a known manner, by means of chains and/or baffle plates. These are manufactured on an industrial scale and can be obtained on the market at low cost.

In an advantageous enhancement of the invention, at least one rotor following in the feed direction of the material has more striking tools than the rotor placed before it. Thus, the frequency of particle collisions with striking tools in the lower high-energy range in which the rotors turn at a high speed is increased, which assists the process of breaking open virtually all material conglomerates.

A fine particle recovery plant may be connected to the outlet end of the air flow device, e.g. to a hutch chamber or a cyclone, making it possible to recover "valuable" dust for further preparation. Naturally, a dust collector can also be connected at the outlet end of the comminution device, in order, for example, to collect dust for disposal or for preparing the airstream.

In an advantageous enhancement of the invention, the fine particle recovery plant or the dust collector can, optionally, be connected to the air flow device, particularly the fan rotor via a controlled guiding mechanism, which makes it possible to easily control the material flow in line with the individual requests for preparing different particle fractions. This solution can be implemented particularly easily with an even base, as described above.

The guiding mechanism can preferably be controlled via the signal of the dust sensor. In this way, both the inlet area and the fan and also the discharge of particles can be controlled with the dust sensor.

Preferably, impact bars that are either axial or on a slant are arranged on the comminution chamber wall, onto which the flow of material impacts and which divert the flow of material from the comminution chamber wall back in the direction of the sphere of influence of the striking tools, so that this material then re-enters the range of action of the striking tools and can be effectively broken down there.

The radius of the comminution chamber wall is constant, or preferably increasing from the supply end towards the outlet end, which leads to the particles not collecting in the area of the comminution chamber wall, but always falling back into the area of the striking tools, where they are broken down further. In principle, the radius of the comminution chamber wall may even decrease, which may, however, be problematic, due to an increasing risk of congestion. Should the radius of the comminution chamber wall increase downwards, the increase may occur continuously or in stages.

At least if it is cylindrical, the comminution chamber wall contains deflection ribs around it, with which the material flow is diverted from the comminution chamber wall into the range of action of the striking tools. A high degree of efficiency in separating the material conglomerates is achieved in this way. As an alternative or in addition to the deflection ribs, the diameter of the comminution chamber may also increase from the inlet end (or also the supply end) to the outlet end, as a result of which the material stream is also diverted into the direction of the range of action of the striking tools, through the gravity and stream of forced air.

The combination of the technical features explained above thus leads, firstly, to the impact energy of the material conglomerates increasing towards the outlet end, and simultaneously the particle density, which should ultimately lead to the material conglomerates coming into contact with the striking tools and impact bars with a high degree of impact energy in the last section prior to them being discharged from the comminution chamber, which leads to the material conglomerates being scattered, without them being ground up, as is the case in the prior art. The size of the metal particles contained in the material conglomerates is thus not reduced. The resulting fine particles of material are inevitably conveyed through an additional air flow device in the direction of the outlet end of the comminution chamber into a preparation area, in which the particles of material are isolated from the airstream, whereby the retention time of the fine particles of material in the comminution chamber can be regulated via the air flow device. Preferably centrifugal separators, e.g. cyclones, are suitable for this purpose.

The comminution device of the invention thus permits effective comminuting, separation, or release, e.g. of metals and mineral compounds contained in ores or Fe or nonferrous metals from slag or scaling, which is scarcely possible by the known comminution devices in accordance with the prior art. In this respect, the invention makes use of a construction that leads to the impact energy of the material conglomerates to be released onto striking tools and/or impact bars in the comminution chamber being maximized, without the metal components themselves being shredded in the process. Thus, even the smallest components of material in composites can still be economically expediently isolated. Thus, the highest degree of impact energy from material conglomerates to be separated is achieved with the invention, which, even in the case of only a slight grinding effect, leads to the material conglomerates being broken up and released.

In addition, one aspect of the invention consists in increasing the kinetic energy of as many material particles in the comminution chamber as possible in such a way that it can be achieved that the material particles or material conglomerates are, at a certain level of impact energy, impacted with striking tools or impact bars. The applicant has found out that such impact energy leads to the material conglomerates being broken up in a relatively safe manner, without the metal components themselves being crushed a lot.

In order to increase the number of interactions of material particles or material conglomerates in the comminution chamber, impact rails can be formed on the comminution chamber wall, or the number of striking tools which extend inwards axially and radially can be increased. Following the acceleration by means of the striking tools, material particles will bounce against these impact bars and then break up.

The invention is explained below based on a comminution chamber with three sections. It does, however, need to be clarified that the invention also works in the same way with two sections, or also with four or more sections. The axial comminution chamber sections correspond to the axial regions of the rotors.

In the case of the rotors following in the feed direction of the material, the striking tools can be arranged as a constant or differing number. Thus, in the case of the first rotor, for example, i.e. the rotor in the first section, the number of striking tools can be even lower, as the task of this section consists in conveying the particles of material radially outwards so that they are directed into the range of action of the striking tools of the subsequent rotors, on which there are already more striking tools arranged then on the first rotor. Retaining bars can, moreover, be formed on the rotor casing of the first rotor, in order to effectively convey the particles of material in the radial external area of the comminution chamber.

Optionally, noticeably more striking tools can be placed on the second rotor, i.e. the rotor in the second section, than on the first rotor. The purpose of the striking tools is to accelerate the material particles increasingly existing in a greater density outwards and downwards, in the direction of the outlet end. The rotor casing of the second rotor may also have retention bars or a polygonal base, in order to convey the particles into the area located radially outwards, where they are heavily accelerated in die direction of the third rotor by the numerous striking tools in the acceleration chamber.

Preferably most of the striking tools are placed on the third rotor, i.e. on the rotor in the third section prior to the outlet, and these serve the purpose of being more likely to break up the greatly accelerated material particles.

The increasing number of striking tools in the consecutive sections, as well as the increasing rotational speed in the consecutive sections, in conjunction with the opposite rotational direction, thus leads, in all transitional areas, from one section to the next to a maximization of the impact energy, which leads to an effective mechanical release of the material conglomerates. The materials conglomerates broken down into the individual components can subsequently be separated from one another, after they have been discharged from the comminution chamber into inherently known separation or comminution devices, such as flotations, wind separators, magnetic separators, etc.

In order to implement a maximization of the impact energy of the metal particles in the comminution chamber, as well as to ensure the impact of a metal particle on a striking tool, it has proven to be advantageous to attach the striking tools from top to bottom, offset in relation to one another per each rotor (see FIG. 4).

The rotor speeds (rotational speeds) may, in this example, amount in the three sections, from top to bottom, to 800, 1200, and 1500 revolutions/min. respectively, wherein the rotors in the first and second sections rotate in the same direction, and in the second and third sections in the opposite direction to one another. The absolute speed of the striking tools in the outer area of the third section (high-speed impact chamber) is thus over 150 m/s. That means that, in conjunction with the counter-acceleration of the particles in the pre-treatment chamber and the acceleration chamber, impact speeds of over 200 m/s can be achieved.

The impact energy is calculated by the rotational speed of a rotor in conjunction with the weight of a striking tool and the diameter of the comminution chambers. In other words: In order to achieve optimum comminuting or release (particle size or also grain size) different rotational speeds are tested, to achieve the impact energy required.

In this way, the impact speed, and thus the impact energies of the metal particles when coming into contact with the striking tools and/or impact bars in the comminution chamber is maximized within the limits of what is physically possible and expedient.

The striking tools are designed in an inherently known way, as is shown, for example, by DE 10 2005 046 207. They can therefore be formed out of chains and/or baffle plates, or out of combinations of such elements. Ultimately, the design of the striking tools is not relevant to the invention.

The striking tools are preferably hinged to the rotors in such a way that they always remain in their horizontal position. Therefore no high rotational speeds are necessary (as is the case with conventional chains) to bring the striking tools into the horizontal position. In addition, as a result, multiple striking tools can be placed on a rotor, offset from one another, because they no longer hang down when the machine is switched off, possibly getting tangled up in the process. The movable configuration of the striking tools in such a way that they can only be moved on a plane on a normal axis to the cylindrical axis of the comminution chamber, is therefore highly advantageous. It can also be provided for that the striking tools are at least fixed to the rotors in an almost rigid way.

Of course, the invention is not only limited to the use of metal particles in slag but can also be used on all kinds of material conglomerates consisting of materials of differing densities or elasticity.

If the rotor of each section has its own drive mechanism, the rotors can be driven separately via shafts that are concentric to one another via drive mechanisms placed at one end of the comminution chamber, or the drive mechanisms can be located radially within the rotor casings of the corresponding rotors, in particular in the form of external rotor motors. In a preferred embodiment of the invention, a fan is arranged coaxially to the rotors, preferably on a separately driven axis, as to support the action of the air flow device and to lead the dust generated in the comminution chamber in the direction of the material outlet.

Both the comminution chamber wall and the striking tools and rotor casing preferably consist of hard, impact-resistant materials, such as metal or ceramic metal composites. The rotor casing and the comminution chamber wall can optionally be lined with wear plates.

Following terms are used as synonyms: airstream device—air flow device; fan—fan rotor; comminuting—crushing; deflection ribs—impact bars; dust outlet—outlet;

BRIEF DESCRIPTION OF THE DRAWINGS

The invention is described below, for example, based on the schematic drawing. The following is shown there.

DETAILED DESCRIPTION OF THE INVENTION

Figure 1:
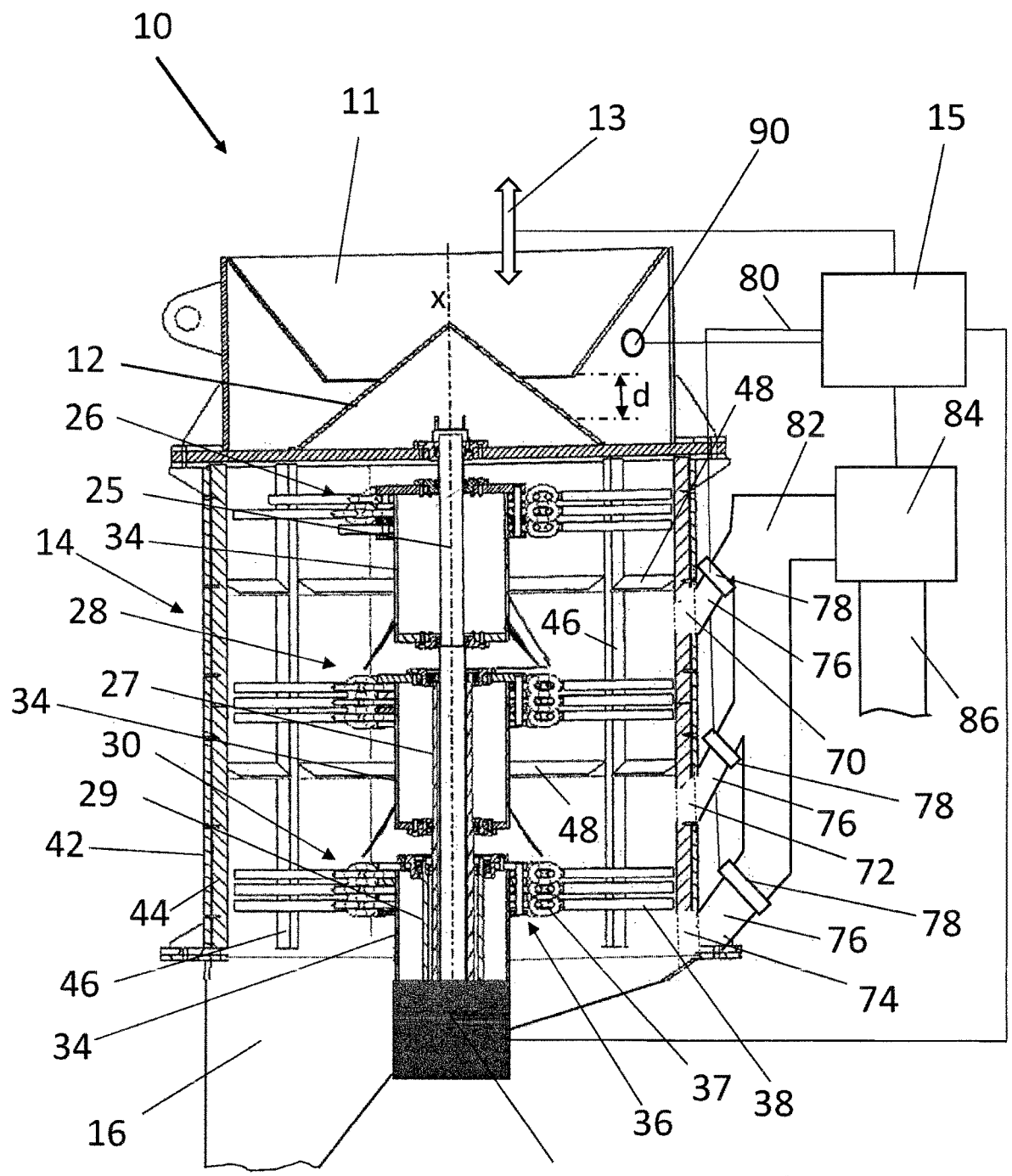
FIG. 1 A longitudinal section through a first embodiment of a mechanical comminution device of the invention with three rotors.

FIG. 1 shows a material comminuting and separation device (or comminution device) 10, which has an inlet hopper 11 and a feed cone 12, which are arranged on a cylindrical comminution chamber 14. The gap "d" between the inlet hopper 11 and the feed cone 12 can preferably be adjusted using a height adjustment system 13 of the inlet hopper 11 in the direction of the cylindrical axis of the comminution chamber, commonly the vertical axis. The height adjustment system 13 is controlled by the device control 15. Both bring about a controlled homogeneous supply of material to the entire range of action of the comminution device, without damaging or wearing down its components, i.e. a complete 360° feeder area in regard to the cylindrical comminution chamber. Under the comminution chamber a material discharge funnel 16 is located. The inlet hopper 11, feed cone 12, comminution chamber 14, and the material discharge funnel 16 are connected with one another and preferably rest on a frame not shown in the Figure. The center axis x of the cylindrical comminution chamber 14, which is also the rotational axis, extends vertically.

Figure 4:
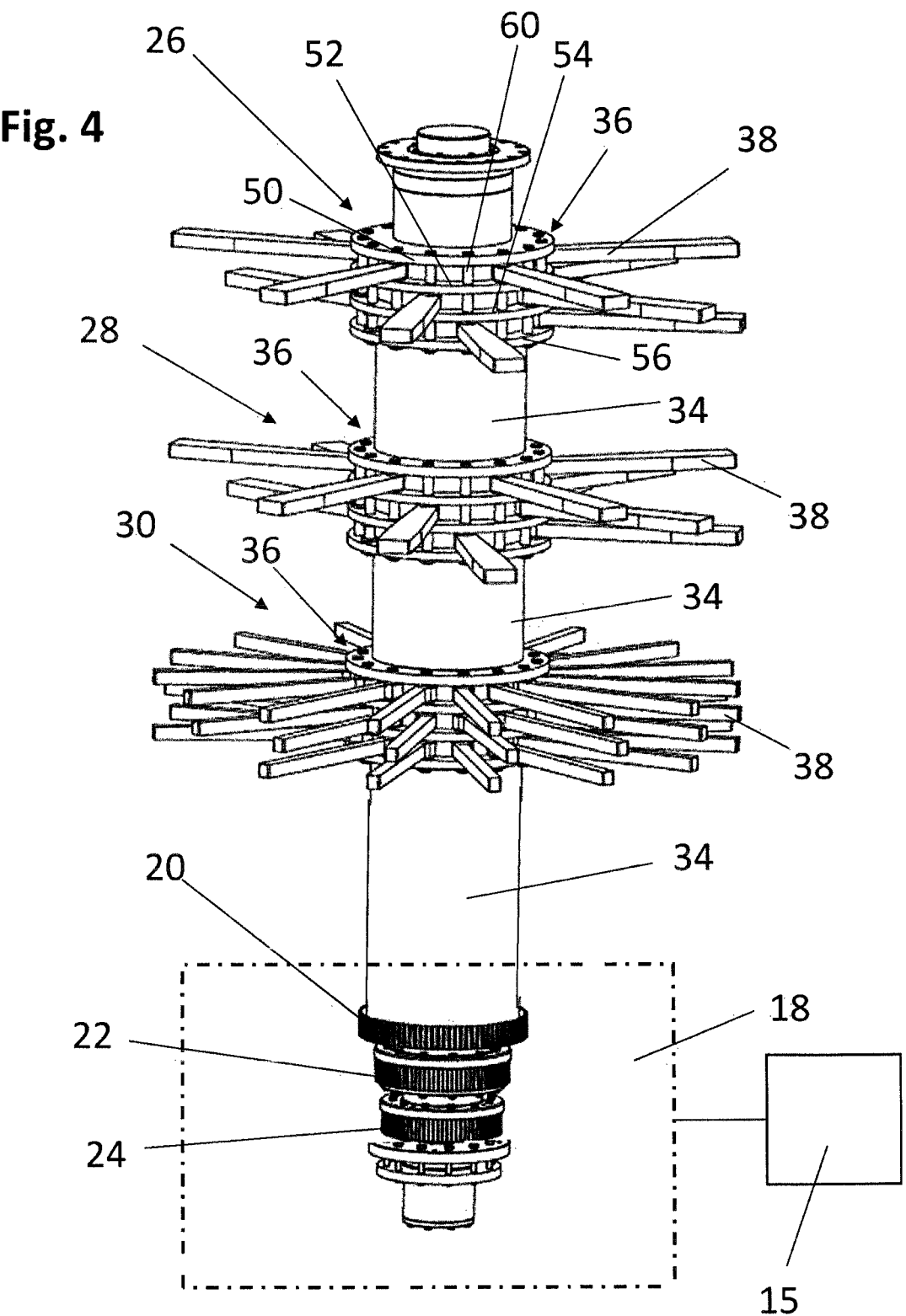
FIG. 4 A perspective view of an axis with three rotors and a fan rotor from FIG. 1.

Three concentric shafts 25, 27, and 29 are provided for in the center x of the comminution chamber which is connected to three separate drives located in a drive unit 18, controlled by the device control 15. As can in particular also be inferred from the perspective representation in FIG. 4, these three concentric shafts 25, 27, and 29 are driven by separate drive mechanisms, which are, in the present example, not shown, but which are inherently known and are located in the drive unit 18. The drive mechanisms allow for the three rotors 26, 28, and 30 to be controlled separately by gear wheels 20, 22, and 24 (FIG. 4) with a desired rotational direction and desired rotational speed. Each rotor has a cylindrical rotor casing 34, the diameter of which is identical in the case of all three rotors 26, 28, and 30. Each rotor furthermore contains a fastening device 36 for striking tools 38, which are fastened to the fastening device 36 of the rotors 26, 28, and 30. In the embodiment of FIG. 4, the striking tools 38 remain in a horizontal position, i.e. transverse to the rotor axis, independent of the rotation of the rotors. In FIG. 1 the striking tools, e.g. striking bars are mounted to the rotors 26, 28, 30 by chain parts 37. Accordingly, these striking tools 38 hang down during standstill of the comminution device and are moving into radial position driven by rotational force when the rotors 26, 28, 30 rotate.

The comminution chamber 14 contains a cylindrical comminution chamber wall 42, on the inside of which, facing the comminution chamber, wear plates 44, which protect the comminution chamber wall, may be fastened. The wear plates 44 are preferably attached to the comminution chamber wall in such a way that they can be exchanged. Furthermore, impact bars 46 are arranged to run vertically on the inside wall of the comminution chamber 14 preferably at a distance of 45 degrees, which serve as an impacting surface for the material accelerated through the striking tools 38.

Deflection ribs 48 are preferably provided for all the way around at a level in the area of the first and second rotors, which are in particular placed in a circular formation on the inside of the comminution chamber wall 42 and serve to guide the flow of material from the comminution chamber wall 42 into the range of action of the striking tools 38.

While shredded material is discharged through the discharge funnel 16 a large amount of dust, i.e. of a particle/air mixture is generated during the heavy crushing operation of the comminution device 10 inside the comminution chamber 14. This dust is discharged through dust outlets 70, 72, and 74 located in the comminution chamber wall 42, preferably at one or several positions in the circumference of the comminution chamber 14 and preferably at different levels. Thus, first dust outlets 70 are provided below the uppermost rotor 26. Second dust outlets 72 are provided below the second rotor 28 and third dust outlets 74 are provided below the third lowermost rotor 30. All dust outlets 70, 72, and 74 in the chamber wall 42 and the wear plates 44 are open to connection channels 76 tilted upwards as to block the access of heavier particles from the comminution chamber 14. By the upwards extension of the connection channels 76 it is ensured that only dust is really fed through the dust outlets 70, 72, 74. Optionally in each connection channel 76 a shutting valve 78 is arranged to block the corresponding dust outlet 70, 72, and 74. The shutting valves are controlled by the device control 15 via a control line 80. By this means it is possible to gather different dust fractions from different parts of the comminution chamber which might be valuable in extracting certain materials. The connection channels 76 are connected to a collector duct 82 which again is connected to the air flow device 84. The air flow device 84 comprises at least one fan or the like to suck the dust from the comminution chamber 14. The air flow device is connected to an outlet duct 86 via which the particle/air mixture is led to further processing steps or to a recycling/cleaning plant or the like. The further processing also might include further separating devices, e.g. a gravity separator, a rotational separator, e.g. a cyclone, floaters etc.

A dust sensor 90 can be located in the inlet area of the comminution chamber 14 or in the comminution chamber 14 itself. The dust sensor 90 is connected to the device control and allows a crushing and discharge operation optimized for the fed material and/or optimized in order to contain a certain level of dust during operation and preventing dust discharging out of the inlet area. Of the comminution device 10. The drive unit 18 controlling the speed of the three shafts 25, 27, and 29, the speed of the fan in the air flow device as well as the distance d of the inlet hopper 11 from the feed cone 12 can be controlled by the device control 15 in response to the signals of the dust sensor 90.

Figure 2:
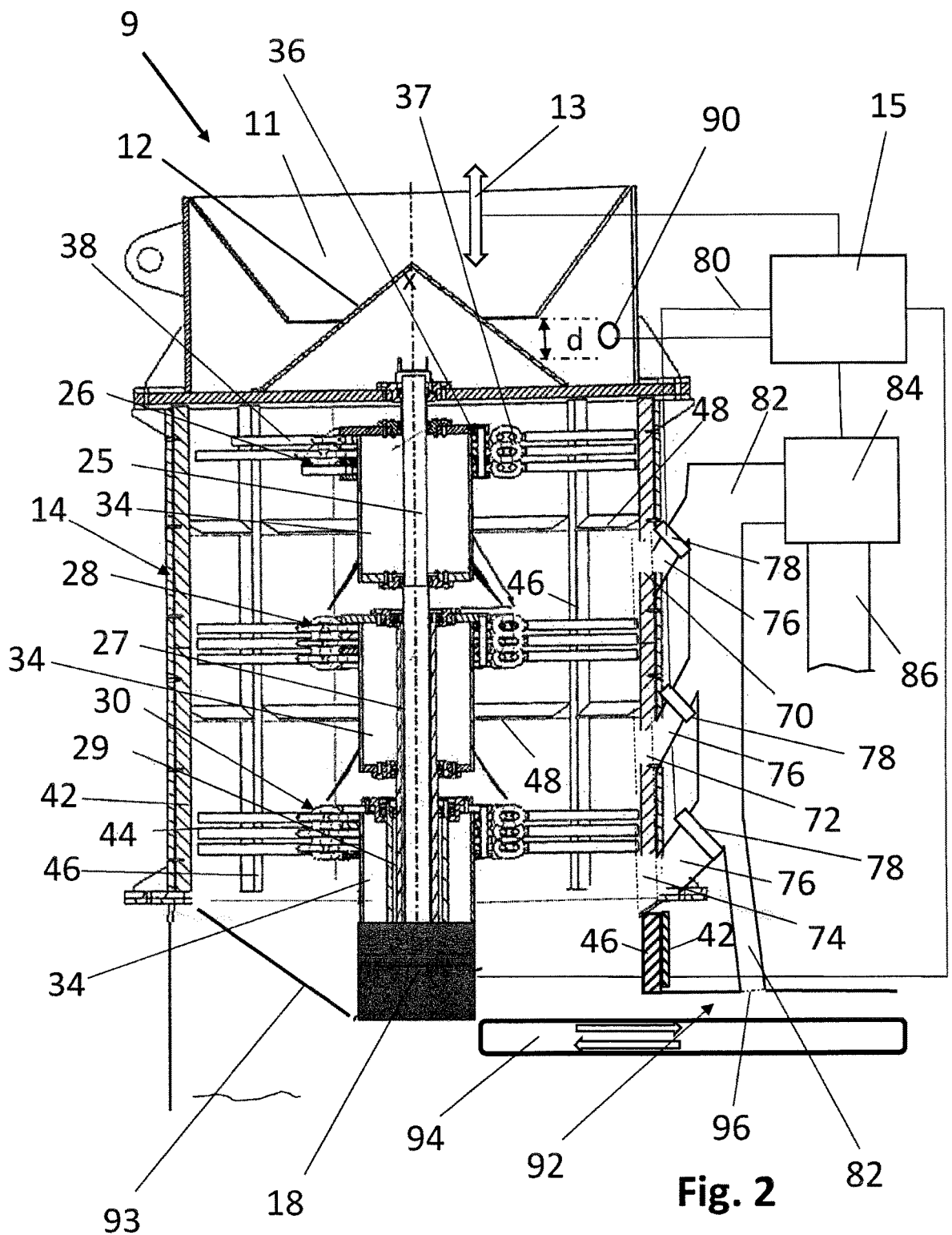
FIG. 2 A longitudinal section through a second embodiment of a mechanical comminution device similar to FIG. 1 having a material outlet acting as dust outlet.

FIG. 2 shows a comminuting device similar to FIG. 1. In contrast to the comminution device having an outlet discharge funnel 16 of FIG. 1, the comminution device 9 of FIG. 2 has a funnel like chamber bottom 93, leading to a material outlet 92 for the discharge of the crushed material. The material outlet 92 is e.g. provided in connection with a conveyor means 94, e.g. a conveyor belt. The collecting duct 82 of the air flow device 84 is connected with a dust outlet 96 in the material outlet 92, which may be used either alone or in combination with the dust outlets 70, 72, 74 in the chamber wall 42. The dust outlet 96 in the material outlet 92 is preferably provided with a grid to avoid the sucking in of larger particles from the material outlet 92.

Figure 3:
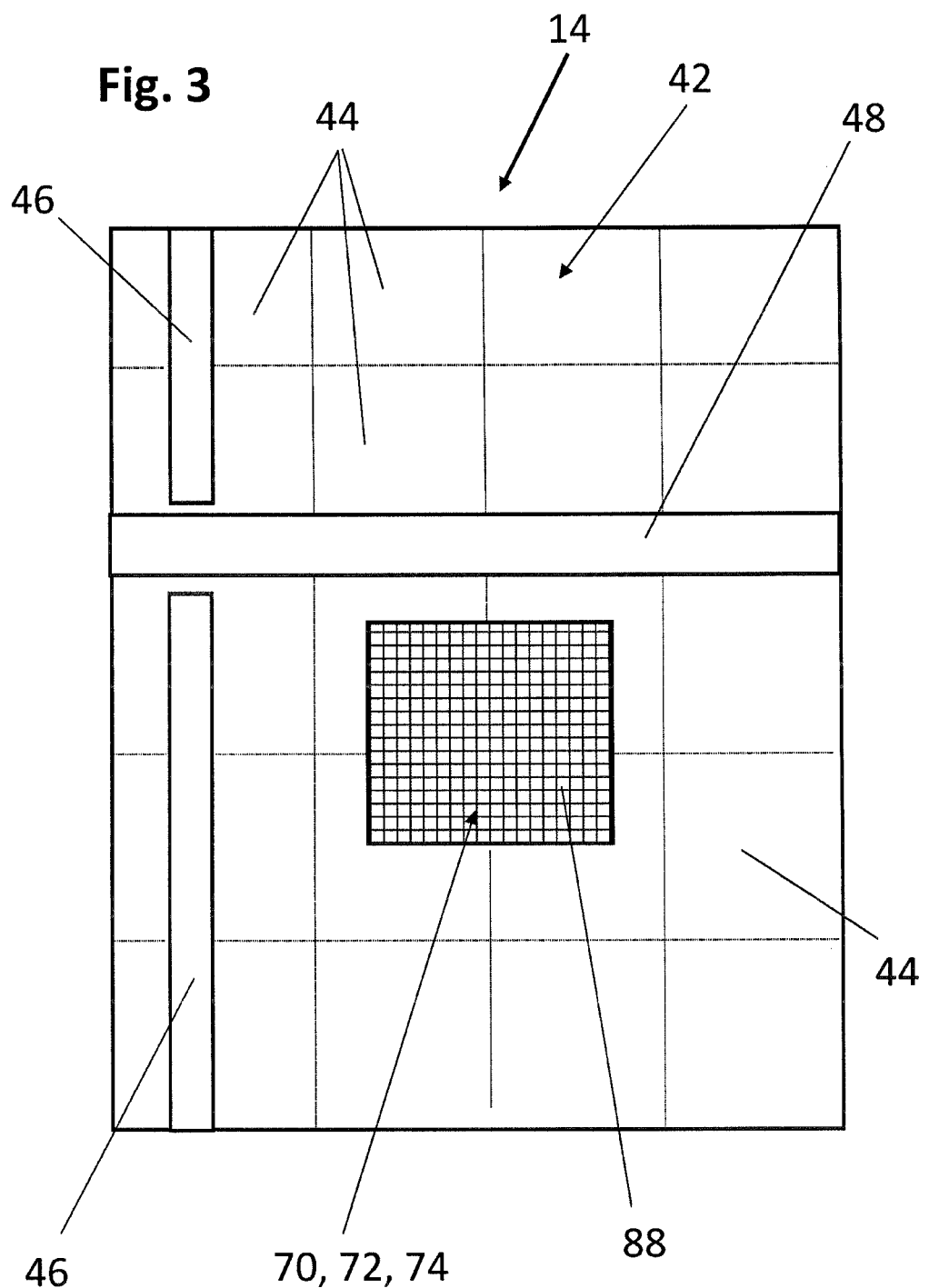
FIG. 3 A view on the comminution chamber wall from the inside of the comminution chamber in greater detail.

FIG. 3 shows a view from the inside of the comminution chamber 14 to the inner side of the chamber wall 42 of the comminution chamber 14. The inner side of the chamber wall 42 is cladded with wear plates 44. The dust outlets 70, 72, and 74 of the comminution device of FIG. 1 or 2 are located preferably below the deflection ribs 48, so that coarser material is deflected by the impact bars 46 away from the dust outlets 70, 72, and 74. The dust outlets 70, 72, and 74 may preferably be covered with a grid 88 to prevent coarser material from entering. As the dust outlets 70, 72, and 74 are connected to upwards extending connection channels 76 any coarser material entering the dust outlets 70, 72, and 74 would, caused by gravity, fall back into the comminution chamber 14. Only fine particles in the particle/air mixture are thus sucked by the air flow device 84 and are forwarded via the outlet duct 86 for further processing of the particles contained in the dust.

The design of the rotors can be better seen from FIG. 4, which shows a perspective representation of the rotor configuration inserted centrally in FIG. 1 or 2.

The fastening device 36 of each rotor 26, 28 and 30 preferably comprises four discs 50, 52, 54 and 56 concentric to one another, each of which having holes that are aligned to one another. These concentric holes are penetrated by bolts 60, which pierce through perforations at the inner end of the striking tools 38 facing the rotor and thus pinpoint the latter on the rotor 26, 28, 30. The fastening device 36 may, however, also be designed differently.

In the present example, in the case of each rotor 26, 28 and 30 the striking tools 38 can be established at three different height positions between the four discs 50, 52, 54 and 56. Even though the rotors 26, 28 and 30 are also provided for identically in the present embodiment, it may also be provided for that the rotors located further down have an increasing number of options for attaching the striking tools or that there are more striking tools suspended from the lower rotors than the upper rotors, as shown in the example. For example, more concentric discs could be constructed on the lower rotors and less concentric discs on the upper rotors. It is, in any event, worthwhile for the density of the striking tools in the lower separating comb area, where high particle speeds prevail, to be greater, whereby the efficiency of the equipment is improved.

In the present embodiment, baffle plates are provided as striking tools 38, which are attached to the fastening device 36 of the rotors 26, 28, and 30. Instead of baffle plates, link chains or other inherently common striking tools can also be used. When the rotor is still, the striking tools are usually suspended and are pressed outward by the rotational force with an increasing rotational speed, until they attain the operational orientation shown in the figure, in which they point radially outwards from the rotor 26, 28, or 30 respectively in the direction of the comminution chamber wall 42.

The comminuting mechanism in the comminuting and separation chamber can be set via the rotors 26, 28, and 30, while the flow conditions, and thus also the retention times of the ultrafine particles in the comminution chamber can be set via the gap "d" between the inlet hopper and the feed cone, as well as via the control of the air flow device, e.g. a fan or fan array. As a result, in order to ensure optimum separation of the components contained in the material conglomerate, it is possible to control the comminuting and separation device in such a way that it is customized for specific material conglomerates.

The operation of the material comminution device is explained briefly below:

Material to be separated, e.g. ores containing metal, industrial slag containing metal or slag with metal inclusions, is supplied in a controlled way via the inlet hopper 11 and the feed cone 12, namely by adjusting the gap "d" by means of vertical adjustment, via the height adjustment system 13, of the inlet hopper 11 of the comminution chamber 14 of the comminution device 10, controlled by the device control 15. The coarse material there initially falls down due to its heavyweight into the outlet discharge funnel 16. Finer material and particles are mixed up in the heavy dust generated during the crushing action and is led via the dust outlets 70, 72, 74, the connection channels 76, the collector duct 82 by the air flow device 84 into the outlet duct 86 for further processing or recycling or discharging according to the value of the particles in the air/particle mixture.

The rotors 26, 28, and 30 preferably always rotate in opposite directions to one another, i.e. with alternating rotational directions, wherein the rotational speed can preferably increase from top to bottom. The rotational speed of the upper rotor may, for example, amount to 800 revolutions/min, while the middle rotor turns at 1200 revolutions/min and the lower rotor at 1500 revolutions/min. The material that trickles down is partly shredded by the striking tools 38 on the uppermost first rotor 26, and partly accelerated in the circumferential direction of the rotor. The material either collides with the impact bars 46 or the striking tools 38 of the middle rotor 28 turning in the opposite direction, where the particles of material now, due to the prior acceleration by the upper rotor in the opposite direction, collide at a higher speed, as a result of which the comminuting effect is significantly increased. In addition, also in the case of the middle second rotor, the rotational speed may be greater than in the case of the first rotor 26, so that, also, in this case, the impact on the particles of material is greater than in the case of the upper rotor. In addition, the material particles strike the impact bars 46 running vertically, and are likewise shredded there. Material that trickles down in the area of the comminution chamber wall 42 is re-conveyed by the deflection ribs 48 back into the area located further inwards of the comminution chamber 14 radially, where it is guided to the range of action of the striking tools 38. Since the striking tools on each rotor are placed at various heights (see FIG. 3), a very high likelihood of each particle of material colliding with a striking tool is achieved, with makes for good efficiency of the device.

The lowest, third rotor 30 in the outlet area can rotate at the highest speed. Also in this case it is to be borne in mind that, through the middle, second rotor 28, the material particles are subjected to a greater acceleration in the opposite direction, so that the particles now collide with the lower rotor 30, turning in the opposite direction, at a correspondingly increased counter-speed. Preferably most of the striking tools 38 are located in the area of the lower rotor 30, so that there is a high likelihood here of particles colliding with striking tools 30 or with the vertical impact bars 46. This leads to a very effective comminuting of material.

The invention is not limited to the present embodiments, but variations are possible within the scope of protection of the following claims.

Very high amounts of impact energy of material conglomerates to be separated against the striking tools are achieved with the invention, wherein the particles broken up can be effectively conveyed for further preparation. In addition, the material separation can be controlled by effectively regulating the material flow, in particular the flow of ultrafine particles.

In particular, the number and distribution of the striking tools may differ from the example shown. Various different striking tools, such as chains and baffle plates, may be used. Very many more striking tools may be distributed over the circumference in the area of the lowest rotor than in the areas further up. This leads, in the area of the third section, to an increased likelihood of collisions.

The comminution chamber wall can have a sector that can be opened, in order to make access to the comminution chamber possible, for example, for undertaking maintenance work. Consumable parts, such as the striking tools 38 or the wear plates 44, can thus be much more easily exchanged.

REFERENCE NUMBERS 9 comminution device—second embodiment
10 comminution device—first embodiment
11 inlet hopper—inlet funnel
12 delivery cone
13 adjustment system for moving the inlet hopper to adjust the width d of the feed gap
14 comminution chamber
15 device control
16 material outlet funnel
18 drive unit containing the separate drives for the separate rotor shafts
20 upper rotor gear
22 middle rotor gear
24 lower rotor gear
25 shaft of the upper rotor
26 shaft of the middle rotor
27 shaft of the lower rotor
28 upper rotor
29 middle rotor
30 lower rotor
34 rotor casing
36 fastening device for the striking tools
37 connecting chain members of the striking tools in FIG. 1
38 striking tools
42 comminution chamber wall
44 wear plates at the inner side of the comminution chamber wall
46 vertical deflection ribs—impact bars
48 annular deflection ribs
50 first disc of the fastening device
52 second disc of the fastening device
54 third disc of the fastening device
56 fourth disc of the fastening device
60 bolts extending between aligned holes in the disc penetrating a hole in the striking tool
70 upper dust outlet(s)

72 middle dust outlet(s)
74 lower dust outlets)
76 connection channels
78 shutting valves in the connection channels
80 control line for the shutting valves
82 collecting duct
84 air flow device
86 outlet duct
88 grid in the dust outlets
90 dust sensor
92 material outlet
93 funnel like chamber bottom
94 conveyor belt
96 dust outlet in the material outlet
d width of the feed gap

The invention claimed is:

1. A comminution device for mechanically comminuting material conglomerates comprised of materials of varying density and/or consistency, comprising a comminution chamber having a supply side with a supply device above the comminution chamber and a discharge side, the comminution chamber is enclosed by a circular cylindrical comminution chamber wall and has at least two portions in succession in an axial direction, in each of the at least two portions at least one rotor is arranged coaxial with the comminution chamber, each rotor having a rotor shaft and striking tools which extend substantially radially into the comminution chamber at least during operation, the rotors having opposite directions of rotation in at least two successive portions, deflection ribs being arranged inside of the comminution chamber wall, wherein a plurality of dust outlets are arranged in the comminution chamber wall and are connected to an air flow device for discharging a particle/air mixture produced in the comminution chamber, the air flow device has at least one fan for transporting the particle/air mixture from the comminution chamber, wherein the plurality of dust outlets are connected to an end of a channel and the airflow device is connected to another end of the channel located outside the comminution chamber wall, and wherein the comminution device has a control system for a fan drive of the fan, and a dust sensor is arranged on the supply side, and the fan drive can be controlled as a function of an output signal of the dust sensor.

2. The comminution device according to claim 1, wherein at least a portion of the channel extends in an upwards direction.

3. The comminution device according to claim 1, wherein the at least one dust outlet is covered with a grid.

4. The comminution device according to claim 1, wherein the at least one dust outlet is arranged below an upper portion and/or below a lower portion of the comminution chamber.

5. The comminution device according to claim 1, wherein an inlet funnel is arranged above the supply device, an inlet region of adjustable size being formed between the inlet funnel and the supply device.

6. The comminution device according to claim 5, wherein the inlet funnel is arranged coaxial with a central axis of the comminution chamber so as to be displaceable in an axial direction.

7. The comminution device according to claim 1, wherein the control system and the fan drive allow operation of the fan at different rotational speeds, and a rotational speed can be controlled as a function of the output signal of the dust sensor.

8. The comminution device according to claim 1, wherein the striking tools are arranged offset from one another in a plurality of planes.

9. The comminution device according to claim 1, wherein in portions in succession from the supply side to the discharge side, the rotors have a rotor casing, a radius of which remains constant over an axial length of the comminution chamber.

10. The comminution device according to claim 1, wherein each rotor has its own drive which is controllable independently of other rotors.

11. The comminution device according to claim 1, wherein each rotor has a fastening device for releasably fastening the striking tools.

12. The comminution device according to claim 1, wherein a rotor downstream in a delivery direction of the material conglomerates has more striking tools than rotors arranged upstream therefrom.

13. The comminution device according to claim 1, wherein axially or obliquely extending deflector strips are arranged on the comminution chamber wall.

14. The comminution device according to claim 1, wherein the deflection ribs are arranged annularly and/or vertically on an inside of the comminution chamber wall.

15. The comminution device according to claim 1, wherein the supply device comprises a delivery cone covering a central region of the rotors.

16. The comminution device according to claim 15, wherein the delivery cone co-acts with an inlet funnel, via an adjustment system, to provide a feed gap of adjustable width.

17. The comminution device according to claim 1, wherein at least one dust outlet is arranged in a material outlet of the comminution chamber.

* * * * *